(12) United States Patent
Kajimoto et al.

(10) Patent No.: US 10,970,601 B2
(45) Date of Patent: Apr. 6, 2021

(54) INTERMEDIATE PROCESS STATE ESTIMATION METHOD

(71) Applicants: Tetsuya Kajimoto, Nagakute (JP); Yutaka Sasaki, Nagoya (JP); Makoto Miwa, Nagoya (JP); Yuta Hayashida, Nagoya (JP)

(72) Inventors: Tetsuya Kajimoto, Nagakute (JP); Yutaka Sasaki, Nagoya (JP); Makoto Miwa, Nagoya (JP); Yuta Hayashida, Nagoya (JP)

(73) Assignees: TOYOTA JIDOSHA KABUSHIKI KAISHA, Toyota (JP); TOYOTA SCHOOL FOUNDATION, Nagoya (JP)

( * ) Notice: Subject to any disclaimer, the term of this patent is extended or adjusted under 35 U.S.C. 154(b) by 63 days.

(21) Appl. No.: 16/400,203

(22) Filed: May 1, 2019

(65) Prior Publication Data

US 2019/0392259 A1    Dec. 26, 2019

(30) Foreign Application Priority Data

Jun. 26, 2018    (JP) .............................. JP2018-120646

(51) Int. Cl.
*G06K 9/00* (2006.01)
*G06K 9/62* (2006.01)

(52) U.S. Cl.
CPC ......... *G06K 9/6262* (2013.01); *G06K 9/6256* (2013.01)

(58) Field of Classification Search
CPC .................................................. G06K 9/6262
See application file for complete search history.

(56) References Cited

U.S. PATENT DOCUMENTS

| 2014/0197577 | A1* | 7/2014 | Gretton | .................. | B28B 7/346 |
| | | | | | 264/400 |
| 2017/0100214 | A1* | 4/2017 | Wen | ..................... | G06F 19/3481 |
| 2018/0095450 | A1* | 4/2018 | Lappas | ................... | G06T 19/00 |
| 2019/0102880 | A1* | 4/2019 | Parpara | .................. | G06T 17/10 |
| 2020/0242764 | A1* | 7/2020 | Aoyama | .............. | A61B 5/7275 |

OTHER PUBLICATIONS

Antipov, G., et al., "Face Aging With Conditional Generative Adversarial Networks", arXiv:1720.01983v2, May 30, 2017, pp. 1-5.

* cited by examiner

*Primary Examiner* — Oneal R Mistry
(74) *Attorney, Agent, or Firm* — Oblon, McClelland, Maier & Neustadt, L.L.P.

(57) ABSTRACT

In the intermediate process state estimation method, two generators are used, and as well as inputting a common input noise to the respective generators, a label corresponding to a certain step is input to one generator and a label corresponding to a step different from the certain step is input to the other generator. Then, one of generation data and training data generated by the respective generators is randomly input to a discriminator, and the generators and the discriminator learn in an adversarial manner from the discrimination result in the discriminator. Then, an input noise corresponding to a desired final state and a label corresponding to a step where it is desired that an intermediate process state be estimated are input to the learned generator to estimate the intermediate process state based on the generation data generated by the generator.

3 Claims, 10 Drawing Sheets

PRODUCT SHAPE

IMAGE

| | FIRST ELEMENT | SECOND ELEMENT | THIRD ELEMENT | FOURTH ELEMENT |
|---|---|---|---|---|
| LABEL REPRESENTING STEP 6 OF FIRST PARTIAL PROCESS | 0.8 | 0.2 | 0 | 0 |

| | FIRST ELEMENT | SECOND ELEMENT | THIRD ELEMENT | FOURTH ELEMENT |
|---|---|---|---|---|
| LABEL REPRESENTING STEP 24 OF FIRST PARTIAL PROCESS | 0.2 | 0.8 | 0 | 0 |

Fig. 6

| | FIRST ELEMENT | SECOND ELEMENT | THIRD ELEMENT | FOURTH ELEMENT |
|---|---|---|---|---|
| LABEL REPRESENTING STEP 4 OF SECOND PARTIAL PROCESS | 0 | 0.8 | 0.2 | 0 |

| | FIRST ELEMENT | SECOND ELEMENT | THIRD ELEMENT | FOURTH ELEMENT |
|---|---|---|---|---|
| LABEL REPRESENTING STEP 16 OF SECOND PARTIAL PROCESS | 0 | 0.2 | 0.8 | 0 |

Fig. 7

| | FIRST ELEMENT | SECOND ELEMENT | THIRD ELEMENT | FOURTH ELEMENT |
|---|---|---|---|---|
| LABEL REPRESENTING STEP 6 OF THIRD PARTIAL PROCESS | 0 | 0 | 0.8 | 0.2 |

| | FIRST ELEMENT | SECOND ELEMENT | THIRD ELEMENT | FOURTH ELEMENT |
|---|---|---|---|---|
| LABEL REPRESENTING STEP 24 OF THIRD PARTIAL PROCESS | 0 | 0 | 0.2 | 0.8 |

DEFORMATION PROCESS OF TRAINING IMAGE

DEFORMATION PROCESS OF EXAMPLE

DEFORMATION PROCESS OF COMPARATIVE EXAMPLE

Fig. 13

INTERMEDIATE PROCESS STATE ESTIMATION METHOD

CROSS REFERENCE TO RELATED APPLICATIONS

This application is based upon and claims the benefit of priority from Japanese patent application No. 2018-120646, filed on Jun. 26, 2018, the disclosure of which is incorporated herein in its entirety by reference.

BACKGROUND

The present disclosure relates to an intermediate process state estimation method for estimating, in time series, an intermediate process state in a deformation process optimal for molding from an initial state to a final state for a molding process that proceeds to a final state from an initial state through a plurality of intermediate molded objects.

In recent years, a machine learning method using deep learning has been proposed such as Generative Adversarial Networks (GAN). GAN has two kinds of neural networks, which are a generator and a discriminator, and is a machine learning method in which the generator and the discriminator learn in an adversarial manner. That is, in GAN, a generator and a discriminator learn by competing against each other. For example, a generator tries to learn by deceiving a discriminator and a discriminator tries to learn by performing discrimination more accurately.

For example, when GAN is used to generate a face image, a generator generates a generation image by receiving a latent noise as input which is randomly selected within a range of $[-1, 1]$, and randomly gives either the generation image or a face training image to a discriminator. The discriminator discriminates whether the given image is the generation image or the training image. The generator and the discriminator learn in an adversarial manner by performing error backpropagation of the accuracy of the discrimination in the discriminator so that the generator outputs a generation image which captures features of a face training image.

Further, Grigory Antipov, Moez Baccouche, Jean-Luc Dugelay, arXiv: 1702.01983v2, 30 May 2017 discloses a technique of Age-cGAN (Age-conditional GAN) in which a face input image is changed to correspond to an age group presented by a label vector based on the above-described technique of GAN. In Age-cGAN, a label vector which presents a certain age group of people (for example, those in their 60s) is input to a generator, which has learned by GAN, in addition to a latent noise estimated by an encoder based on a face input image. Then, the generator outputs a generation image in which a face input image is changed to correspond to an age group of the label vector.

SUMMARY

In a molding process, like a forging process, which proceeds to the final state (i.e., a shape of a final molded object) from the initial state (i.e., a shape of a material) through a plurality of intermediate molded objects, it is necessary to estimate, in time series, an intermediate process state optimal for molding from the initial state and the final state which are known in advance. It is necessary for a deformation process from an initial state to a final state that moldability should be taken into consideration. For example, in a forging process, it is necessary to manufacture a mold in advance to obtain a plurality of intermediate molded objects and a final molded object. If moldability is not taken into consideration for a deformation process from an initial state to a final state, problems, such as an unexpected defect in a final state or shortening of a lifetime of a mold, occur.

Accordingly, in a molding process which proceeds to a final state from an initial state through a plurality of intermediate molded objects, it is necessary to estimate a deformation process suitable for molding from a shape of a material, which is an initial state, and a shape of a final molded object, which is a final state. For the above-described molding process, a work for estimating, in time series, an intermediate process state in a deformation process suitable for molding has been performed by a skilled technician based on his/her past experience and intuition. Further, by analyzing with a simulation tool such as CAE, a design of an intermediate process state has been determined after validity of the intermediate process estimated by a skilled technician is confirmed.

As described above, for a molding process which proceeds to a final state from an initial state through a plurality of intermediate molded objects, skill is necessary to estimate, in time series, an intermediate process state in a deformation process optimal for molding. Therefore, for the above-described molding process, a technique for estimating, in time series, an intermediate process state in a deformation process optimal for molding by a generation model using deep learning is demanded.

However, with the technique of Age-cGAN disclosed in Grigory Antipov, Moez Baccouche, Jean-Luc Dugelay, arXiv: 1702.01983v2, 30 May 2017, it is difficult to learn a time-series relationship. For example, in Age-cGAN, when a label vector which presents an age group of people in their 60s is input to a generator in addition to a latent noise estimated by an encoder based on a face input image, the generator changes an input image so as to correspond to that of people in their 60s. However, in Age-cGAN disclosed in Grigory Antipov, Moez Baccouche, Jean-Luc Dugelay, arXiv: 1702.01983v2, 30 May 2017, for example, when label vectors representing people around 45 years of age, around 50 years of age, around 55 years of age and around 60 years of age are respectively input to a generator, generation images respectively output by the generator have sometimes not been in time series.

Accordingly, for a molding process which proceeds to a final state from an initial state through a plurality of intermediate molded objects, it has not been possible to accurately estimate, in time series, an intermediate process state in a deformation process optimal for molding with the technique of Age-cGAN disclosed in Grigory Antipov, Moez Baccouche, Jean-Luc Dugelay, arXiv: 1702.01983v2, 30 May 2017. That is, a series of intermediate process states estimated by using the technique of Age-cGAN disclosed in Grigory Antipov, Moez Baccouche, Jean-Luc Dugelay, arXiv: 1702.01983v2, 30 May 2017 sometimes cannot be achieved in an actual molding process. For example, a processing amount has been reversed before and after a time series (for example, in a subsequent intermediate process state, a protruding part with respect to a previous intermediate process state is formed).

The present disclosure has been made in view of the aforementioned circumstances and an object thereof is to provide an intermediate process state estimation method capable of satisfactorily estimating, in time series, an intermediate process state in a deformation process optimal for molding, for a molding process which proceeds to a final state from an initial state through a plurality of intermediate molded objects.

A first exemplary aspect is an intermediate process state estimation method for estimating, in time series, an intermediate process state in a deformation process optimal for molding from an initial state to a final state for a molding process that proceeds to a final state from an initial state through a plurality of intermediate molded objects, in which two generators configured to generate, by receiving an input noise and a label that corresponds to steps included in a plurality of steps of the molding process as input, generation data corresponding to the label are used, and as well as inputting a common input noise to the respective generators, a label corresponding to a certain step among the plurality of steps is input to one generator and a label corresponding to a step different from the certain step among the plurality of steps is input to the other generator so that generation data corresponding to the input labels is generated in the respective generators, one of a generation data pair composed of data that a label corresponding to the generation data generated by the one generator is linked to and data that a label corresponding to the generation data generated by the other generator is linked to and a training data pair composed of data that a label corresponding to training data that corresponds to the label input to the one generator is linked to and data that a label corresponding to training data that corresponds to the label input to the other generator is linked to is input randomly, and a discriminator configured to discriminate whether the input data pair is the generation data pair or the training data pair is used and the respective generators and the discriminator learn in an adversarial manner from the accuracy of the discrimination result in the discriminator, and an input noise corresponding to a desired final state molded in the molding process that proceeds to the final state from the initial state through the plurality of intermediate molded objects and a label corresponding to a step included in the plurality of steps where it is desired that an intermediate process state be estimated are input to one of the respective learned generators to estimate, based on the generation data generated by the generator, the intermediate process state in the step where it is desired that the intermediate process state be estimated.

It is possible to satisfactorily estimate, in time series, an intermediate process state in a deformation process optimal for molding, for a molding process which proceeds to a final state from an initial state through a plurality of intermediate molded objects.

Further, the molding process is divided into a plurality of sub-processes, and a label vector element corresponding to the sub-process for each step has a value obtained by normalizing a value of a vector element corresponding to the sub-process assuming that a value at the beginning of a time series order of the steps in the sub-process is 0 and a value at the end of a time series order of the steps in the sub-process is 1.

By setting a label corresponding to each of the steps in a method of PairGAN as described above, it is possible to express a time-series relationship by the label representing each of the steps.

Further, an input noise corresponding to a desired final state molded in the molding process is generated by inputting data of the desired final state and a label corresponding to final states in the plurality of steps to a learned encoder, and learning of the encoder is performed by randomly changing an input noise and a label that corresponds to each step included in the plurality of steps and inputting the changed input noise and label to the learned generator so that the learned generator generates encoder training data, then inputting the encoder training data and the label that is used in generating the encoder training data to the encoder so that the encoder generates an input noise, then inputting the input noise and the label that is used in generating the encoder training data to the generator so that the generator generates generation data, and then making the encoder back-propagate an error between the generation data and the encoder training data. By using the encoder, it is possible to satisfactorily estimate an intermediate process state in a predetermined step in the molding process which proceeds to a final state from an initial state through a plurality of intermediate molded objects.

According to the present disclosure, it is possible to satisfactorily estimate, in time series, an intermediate process state in a deformation process optimal for molding, for a molding process which proceeds to a final state from an initial state through a plurality of intermediate molded objects.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the disclosure, the present disclosure according to claims is not limited to the following embodiments. Further, all the components described in the following embodiments are not necessarily indispensable for means to solve problems. For clarifying the explanation, the following descriptions and the drawings are simplified as appropriate. The same symbols are assigned to the same components throughout the drawings and duplicated explanations are omitted as required.

An intermediate process state estimation method according to this embodiment is a method for estimating, in time series, an intermediate process state in a deformation process optimal for molding from an initial state to a final state in a molding process which proceeds to a final state from an initial state through a plurality of intermediate molded objects, by using a method (hereinafter referred to as a method of PairGAN) which is a modification of a method of Age-cGAN. This embodiment will be explained as that a molding process which proceeds to a final state from an initial state through a plurality of intermediate molded objects is a forging process.

Figure 1:
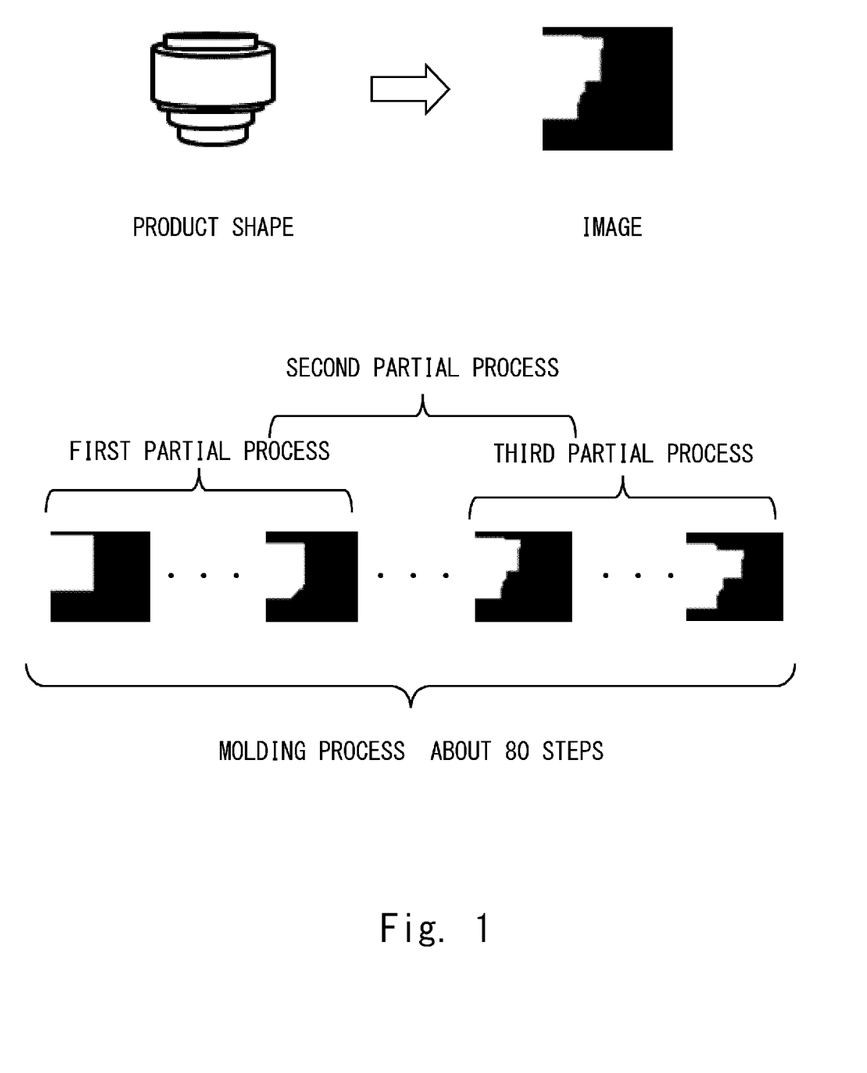
FIG. 1 is a schematic diagram for explaining an example in which a shape is handled as an image, for a forging process to which an intermediate process state estimation method according to an embodiment is applied.

FIG. 1 is a schematic diagram for explaining an example in which a shape is handled as an image for a forging process to which the intermediate process state estimation method according to this embodiment is applied. As shown on the upper left side of FIG. 1, a state (a shape) of a molded object is axially symmetrical in a forging process. Therefore, as shown on the upper right side of FIG. 1, a cross section of the molded object in an initial state, a final state and an intermediate process state is represented by a black-and-white image in the method of PairGAN. Further, as shown in the lower section of FIG. 1, a series of deformation processes between an initial state and a final state of the molded object is divided into a plurality of steps. For example, a forging process is divided into three sub-processes (a first partial process, a second partial process, and a third partial process), and the first partial step is divided into about 30 steps, the second partial process is divided into about 20 steps, and the third partial process is divided into about 30 steps. That is, the forging process is divided into about 80 steps.

Figure 2:
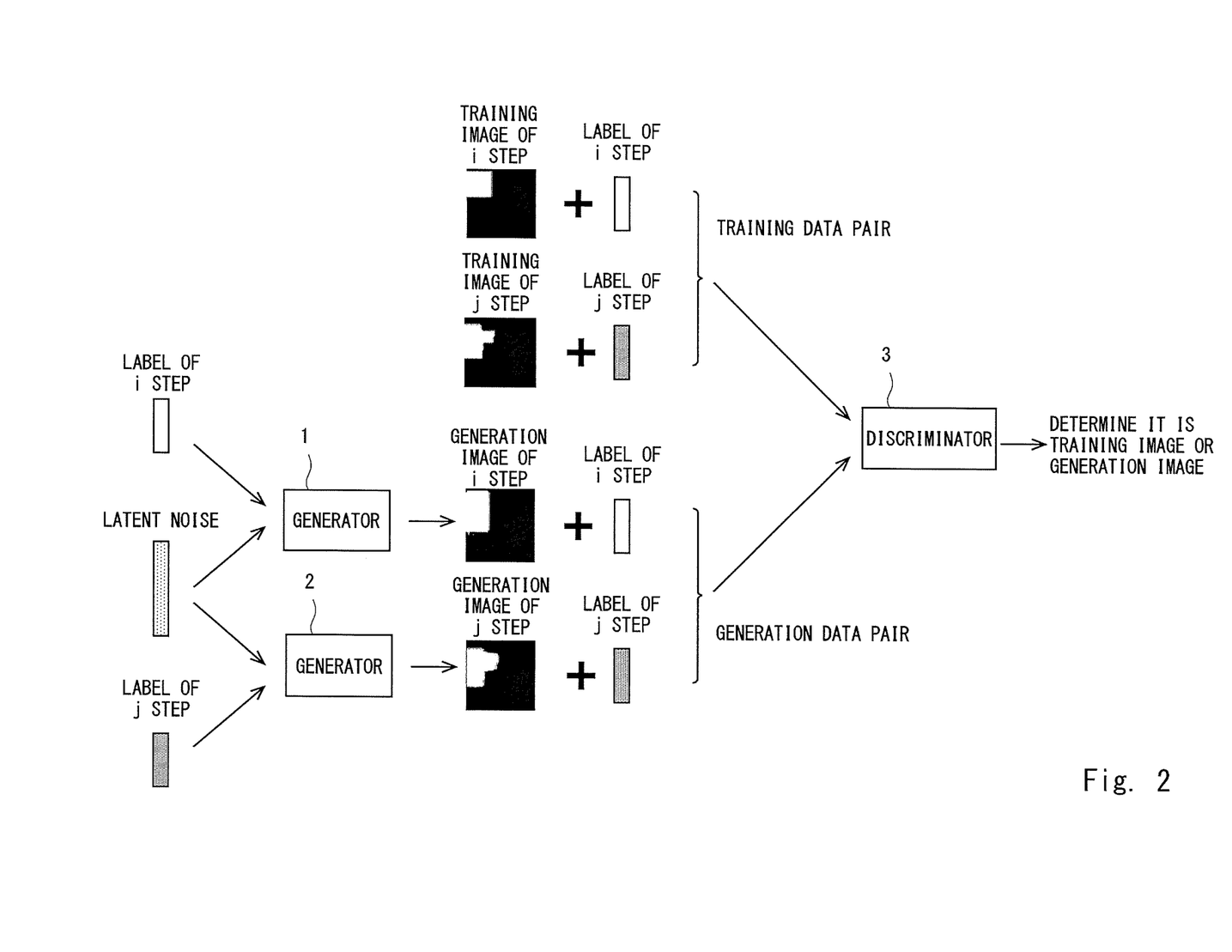
FIG. 2 is a schematic diagram for explaining a learning method in a method of PairGAN used for the intermediate process state estimation method according to the embodiment.

FIG. 2 is a schematic diagram for explaining a learning method in the method of PairGAN used for the intermediate process state estimation method according to this embodiment. As shown in FIG. 2, two generators 1 and 2 and a discriminator 3 are used for the method of PairGAN which is used for the intermediate process state estimation method according to this embodiment.

The generators 1 and 2 generate, by receiving an input noise and a label which corresponds to a step included in a plurality of steps of a molding process as input, a generation image as generation data corresponding to the label. An input noise and a label which corresponds to a certain step i among a plurality of steps are input to one generator 1. Note that the input noise is, for example, a vector (a latent noise) randomly selected within a range of [−1, 1]. An input noise which is common to the input noise input to the generator 1 and a label which corresponds to a step j different from the certain step i among the plurality of steps are input to the other generator 2. Then, a generation image corresponding to the input label is generated in the respective generators 1 and 2.

One of the generation data pair and the training data pair is input to the discriminator 3. Note that the generation data pair is composed of data to which a label corresponding to the generation data generated by the one generator is linked and data to which a label corresponding to the generation data generated by the other generator 2 is linked. The training data pair is composed of data to which a label corresponding to training image as training data which corresponds to a label i input to the one generator 1 is linked and data to which a label corresponding to training image as training data which corresponds to a label j input to the other generator 2 is linked. The discriminator 3 discriminates whether the input data pair is generation data pair or training data pair.

Then, the respective generators 1 and 2 and the discriminator 3 learn in an adversarial manner from the accuracy of the discrimination result as to whether the input data pair is generation data pair or training data pair in the discriminator 3.

Figure 3:
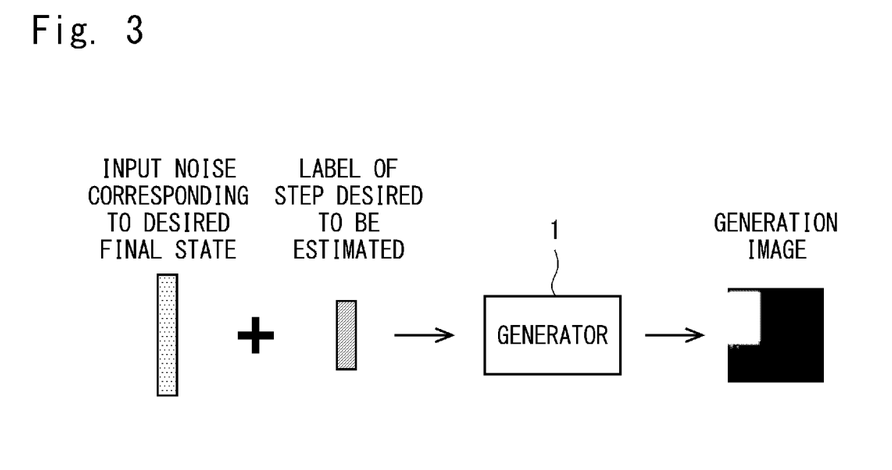
FIG. 3 is a schematic diagram for explaining a method for estimating an intermediate process state with a learned generator by the learning method explained with reference to FIG. 2.

FIG. 3 is a schematic diagram for explaining a method for estimating an intermediate process state with the learned generator 1 or 2 by the learning method explained with reference to FIG. 2. As shown in FIG. 3, an input noise (an estimated nose) corresponding to a desired final state molded in the molding process which proceeds to the final state from the initial state through a plurality of intermediate molded objects, and a label corresponding to a step where it is desired that an intermediate process state be estimated are input to the learned generator 1, the step being in the plurality of steps included in the molding process. Note that a method for generating an estimated noise will be described later. Then, an intermediate process state in the step where it is desired that the intermediate process state be estimated is estimated based on the generation image generated by the generator 1. That is, it is estimated that the generation image generated by the generator 1 is an intermediate process state in the step where it is desired in a deformation process optimal for molding from an initial state to a final state that an intermediate process state be estimated. Note that the generators 1 and 2 share the inner parameters, and either of which may be used.

Figure 4:
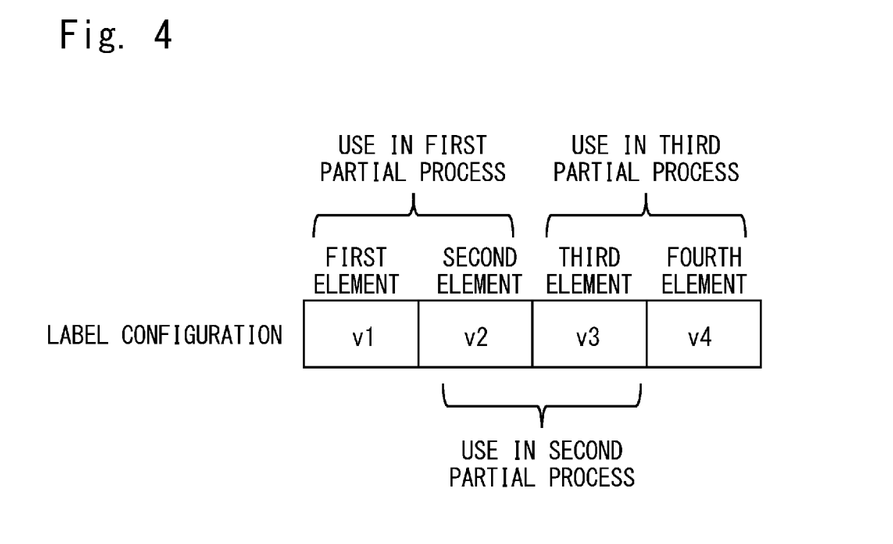
FIG. 4 is a schematic diagram for explaining a method for setting a label corresponding to each step in the method of PairGAN.

Next, a method for setting a label corresponding to each step in the method of PairGAN is described. FIG. 4 is a schematic diagram for explaining a method for setting a label corresponding to each step in the method of PairGAN. As shown in FIG. 4, a label is a vector composed of four vector elements (a first element to a fourth element). As described above, a molding process which proceeds to a final state from an initial state through a plurality of intermediate molded objects is divided into a plurality of sub-processes, and the plurality of sub-processes are divided into a plurality of steps. It is assumed here that a process is divided into three sub-processes (a first partial process, a second partial process, and a third partial process), and the first partial step is divided into about 30 steps, the second partial process is divided into about 20 steps, and the third partial process is divided into about 30 steps.

When a step is included in the first partial process, a first element v1 and a second element v2 are used in a label. When a step is included in the second partial process, the second element v2 and a third element v3 are used in a label. When a step is included in the third partial process, the third element v3 and a fourth element v4 are used in a label. 0 is entered for elements not used.

The label of each of the steps in the sub-process has a value obtained by normalizing a value of a vector element corresponding to the sub-process assuming that a value at the beginning of a time series order of the steps in the sub-process is 0 and a value at the end of a time series order of the steps in the sub-process is 1. In each of the steps included in the first partial process, the aforementioned normalized value is input to the second element v2, a value obtained by subtracting the value of the second element v2 from 1 is input to the first element v1, and 0 is input to the third and the fourth elements v3 and v4. In each of the steps included in the second partial process, the aforementioned normalized value is input to the third element v3, a value obtained by subtracting the value of the third element v3 from 1 is input to the second element v2, and 0 is input to the first and the fourth elements v1 and v4. In each of the steps included in the third partial process, the aforementioned normalized value is input to the fourth element v4, a value obtained by subtracting the value of the fourth element v4 from 1 is input to the third element v3, and 0 is input to the first and the second elements v1 and v2.

Figure 5:
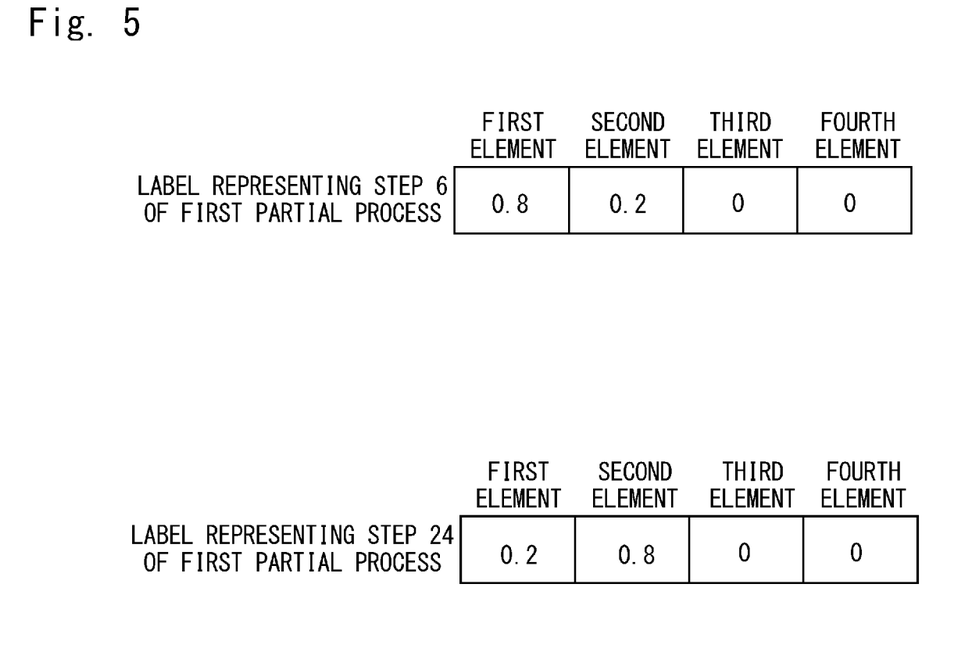
FIG. 5 is a schematic diagram showing a label example of a step in a first partial process.

FIG. 5 is a schematic diagram showing a label example of a step in the first partial process. As shown in the upper section of FIG. 5, since the aforementioned normalized value in a step 6 in the first partial process is 0.2 (6/30=0.2), 0.2 is input to the second element v2, and 0.8 (1−0.2=0.8) which is a value obtained by subtracting 0.2, which is the value of the second element v2, from 1 is input to the first element v1. Further, as shown in the lower section of FIG. 5, since the aforementioned normalized value in a step 24 in the first partial process is 0.8 (24/30=0.8), 0.8 is input to the second element v2, and 0.2 (1−0.8=0.2) which is a value obtained by subtracting 0.8, which is the value of the second element v2, from 1 is input to the first element v1.

Figure 6:
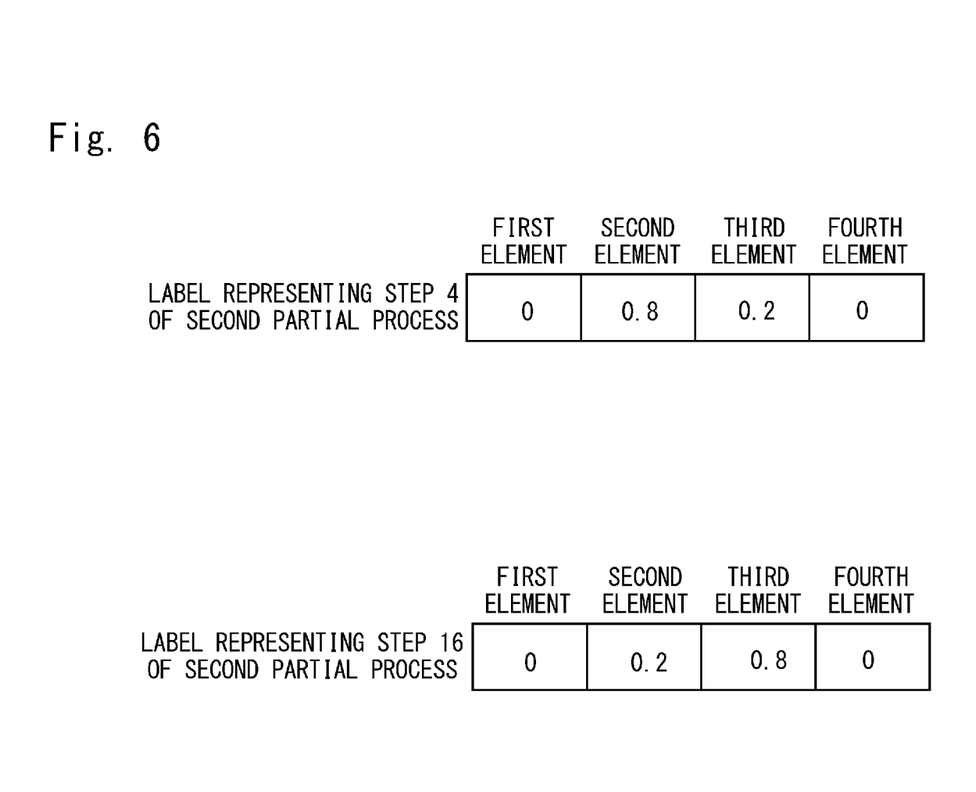
FIG. 6 is a schematic diagram showing a label example of a step in a second partial process.

The above-described matters also apply to the second partial process. FIG. 6 is a schematic diagram showing a label example of a step in the second partial process. As shown in the upper section of FIG. 6, since the aforementioned normalized value in a step 4 in the second partial process is 0.2 (4/20=0.2), 0.2 is input to the third element v3, and 0.8 (1−0.2=0.8) which is a value obtained by subtracting 0.2, which is the value of the third element v3, from 1 is input to the second element v2. Further, as shown in the lower section of FIG. 6, since the aforementioned normalized value in a step 16 in the second partial process is 0.8 (16/20=0.8), 0.8 is input to the third element v3, and 0.2 (1−0.8=0.2) which is a value obtained by subtracting 0.8, which is the value of the third element v3, from 1 is input to the second element v2.

Figure 7:
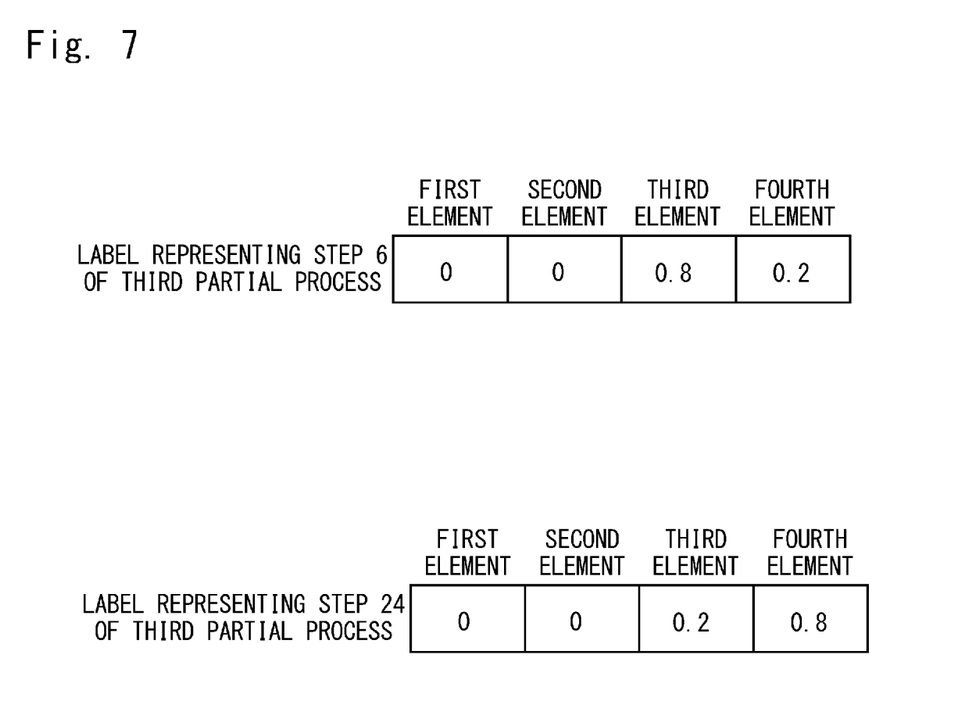
FIG. 7 is a schematic diagram showing a label example of a step in a third partial process.

The above-described matters also apply to the third partial process. FIG. 7 is a schematic diagram showing a label example of a step in the third partial process. As shown in the upper section of FIG. 7, since the aforementioned normalized value in a step 6 in the third partial process is 0.2 (6/30=0.2), 0.2 is input to the fourth element v4, and 0.8 (1−0.2=0.8) which is a value obtained by subtracting 0.2, which is the value of the fourth element v4, from 1 is input to the third element v3. Further, as shown in the lower section of FIG. 7, since the aforementioned normalized value in a step 24 in the third partial process is 0.8 (24/30=0.8), 0.8 is input to the fourth element v4, and 0.2 (1−0.8=0.2) which is a value obtained by subtracting 0.8, which is the value of the fourth element v4, from 1 is input to the third element v3.

By setting a label corresponding to each of the steps in a method of PairGAN as described above, it is possible to express a time-series relationship by the label representing each of the steps.

Next, a method for generating an estimated noise which is an input noise corresponding to a desired final state molded in the molding process which proceeds to the final state from the initial state through a plurality of intermediate molded objects is described. An encoder (an autoencoder) is used for generating an estimated noise. For the encoder, it is necessary to use a learned one.

Figure 8:
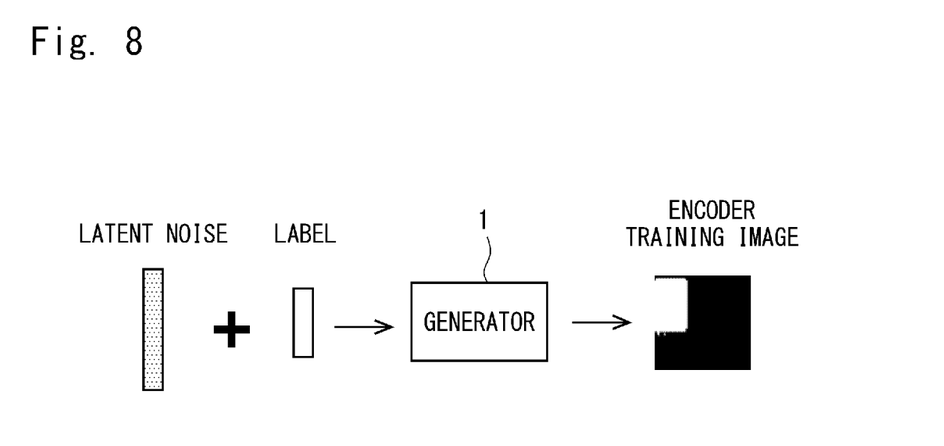
FIG. 8 is a schematic diagram for explaining a learning method of an encoder.
Figure 9:
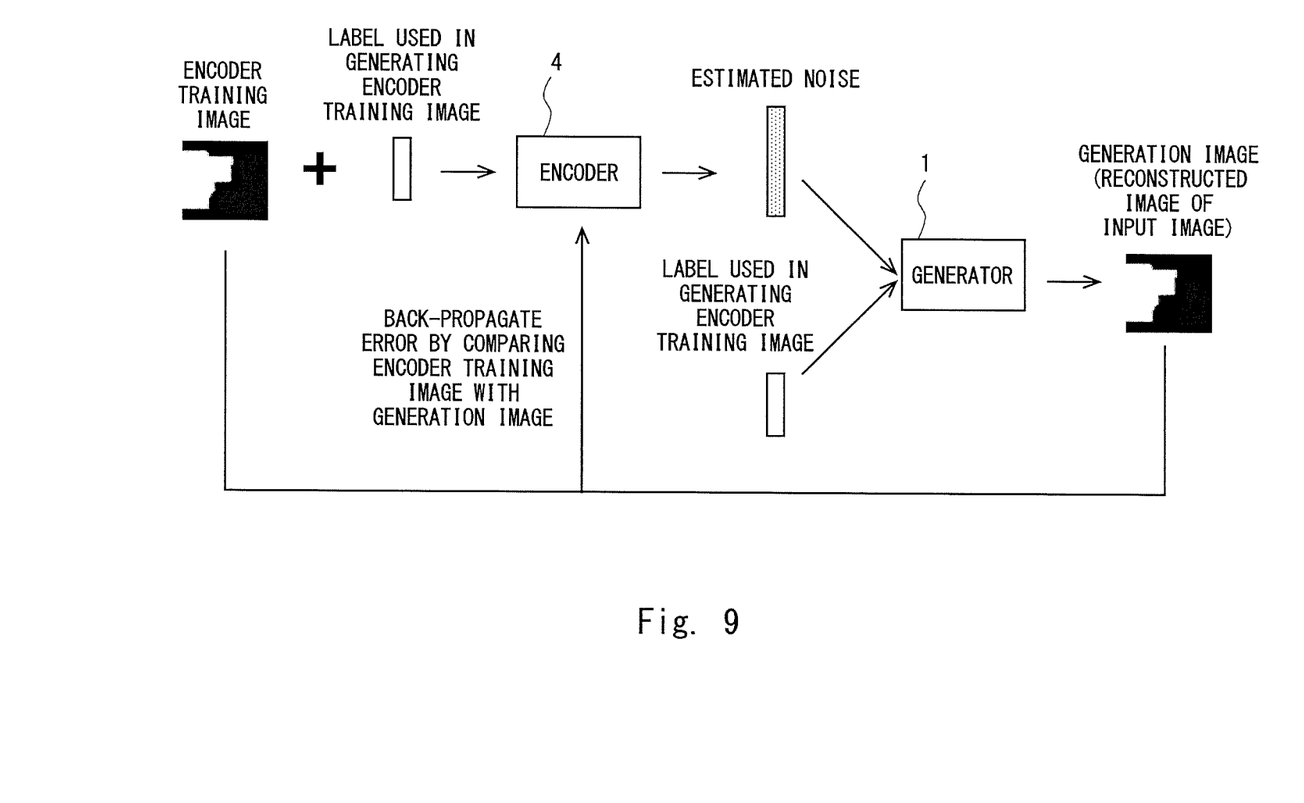
FIG. 9 is a schematic diagram for explaining a learning method of the encoder.

FIGS. 8 and 9 are schematic diagrams for explaining a learning method of an encoder 4. As shown in FIG. 8, in learning of the encoder 4, first, a latent noise as an input noise and a label which corresponds to each step included in a plurality of steps are randomly changed and the changed latent noise and label are input to the learned generator 1, thereby generating an encoder training image as encoder training data.

Next, as shown in FIG. 9, the encoder training image and the label used in generating the encoder training image are input to the encoder 4 so that the encoder 4 generates an input noise. Subsequently, the input noise and the label used in generating the encoder training image are input to the generator 1 so that the generator 1 generates a generation image. Then, the encoder 4 learns by back-propagating an error between the generation image and the encoder training image.

Figure 10:
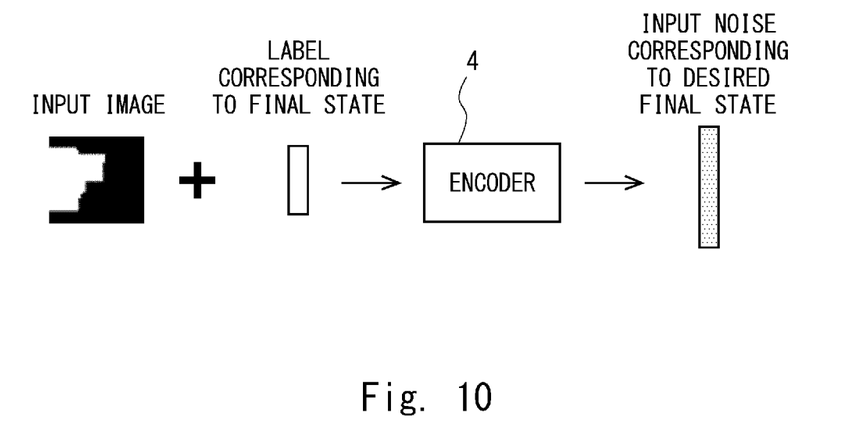
FIG. 10 is a schematic diagram for explaining a method for generating an input noise corresponding to a desired final state molded in a molding process which proceeds to a final state from an initial state through a plurality of intermediate molded objects.

FIG. 10 is a schematic diagram for explaining a method for generating an input noise corresponding to a desired final state molded in a molding process which proceeds to a final state from an initial state through a plurality of intermediate molded objects. As shown in FIG. 10, an input noise corresponding to a desired final state molded in the molding process which proceeds to a final state from an initial state through a plurality of intermediate molded objects is generated by inputting data of the desired final state and a label which corresponds to final states in a plurality of steps to the learned encoder 4. By using the encoder 4 as described above, it is possible to satisfactorily estimate an intermediate process state in a predetermined step in the molding process which proceeds to a final state from an initial state through a plurality of intermediate molded objects.

Next, a verification of validity of the intermediate process state estimation method according to this embodiment is described.

In this verification, a comparison was made between a result (an example) of estimating an intermediate process state by using the method of PairGAN which is the intermediate process state estimation method according to this embodiment and a result (a comparative example) of estimating an intermediate process state by using the method of Age-cGAN.

Figure 11:
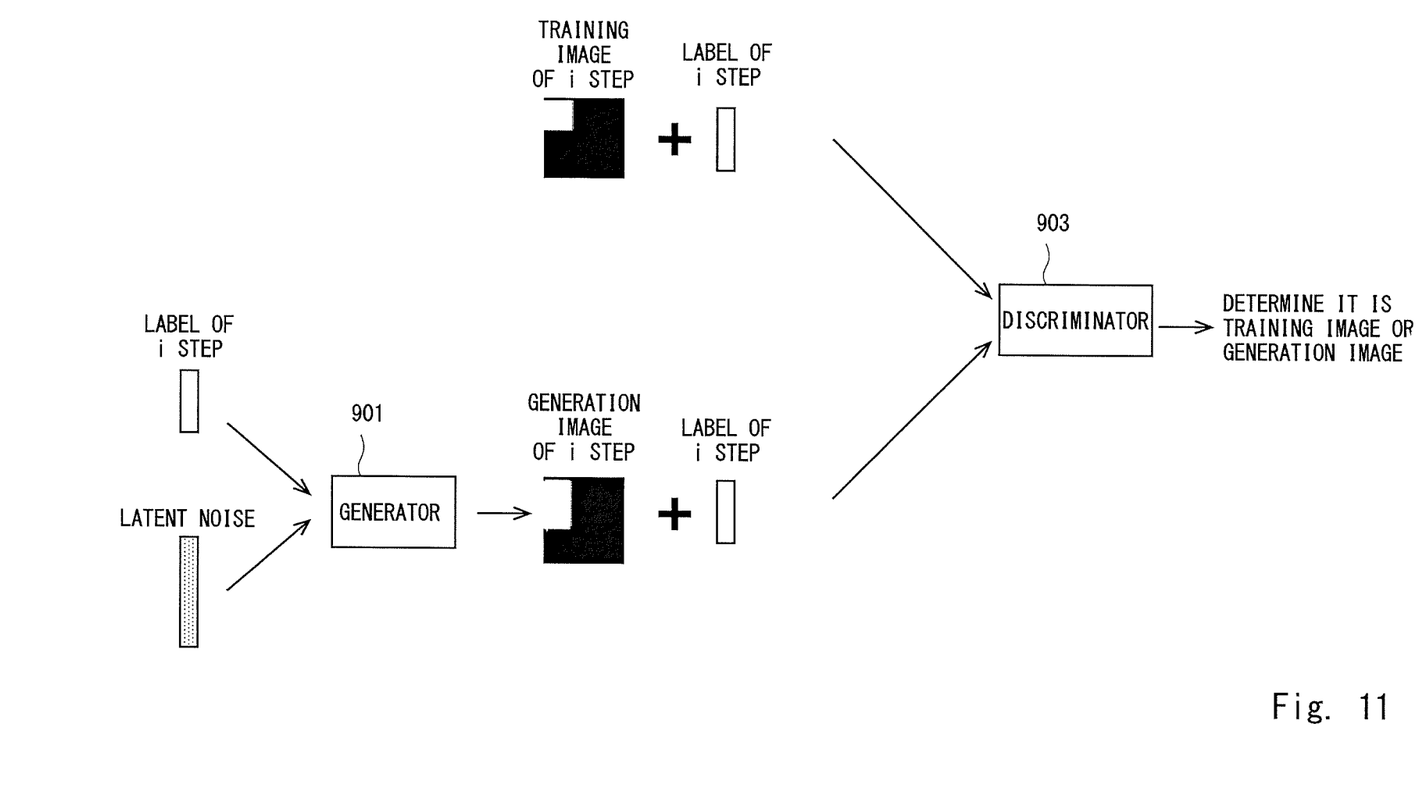
FIG. 11 is a schematic diagram for explaining a learning method in Age-cGAN used for a method for estimating an intermediate process state in a comparative example.

First, a method for estimating an intermediate process state in the comparative example is described. FIG. 11 is a schematic diagram for explaining a learning method in Age-cGAN used for a method for estimating an intermediate process state in the comparative example. As shown in FIG. 11, a generator 901 and a discriminator 903 are used in the method of Age-cGAN which is used for the method for estimating an intermediate process state in the comparative example.

A generator 901 generates, by receiving an input noise and a label which corresponds to a step included in a plurality of steps as input, a generation image as generation data corresponding to the label. An input noise and a label which corresponds to a certain step i among the plurality of steps are input to the generator 901. Note that the input noise is, for example, a vector (a latent noise) randomly selected within a range of [−1, 1]. A generation image corresponding to the input label is generated in the generator 901.

One of data to which a label corresponding to generation data is linked and data to which a label corresponding to training data is linked is randomly input to the discriminator 903. The discriminator 903 discriminates whether the input data is generation data pair or training data. Then, the generator 901 and the discriminator 903 learn in an adversarial manner from the accuracy of the discrimination result as to whether the input data is generation data or training data in the discriminator 903.

Figure 12:
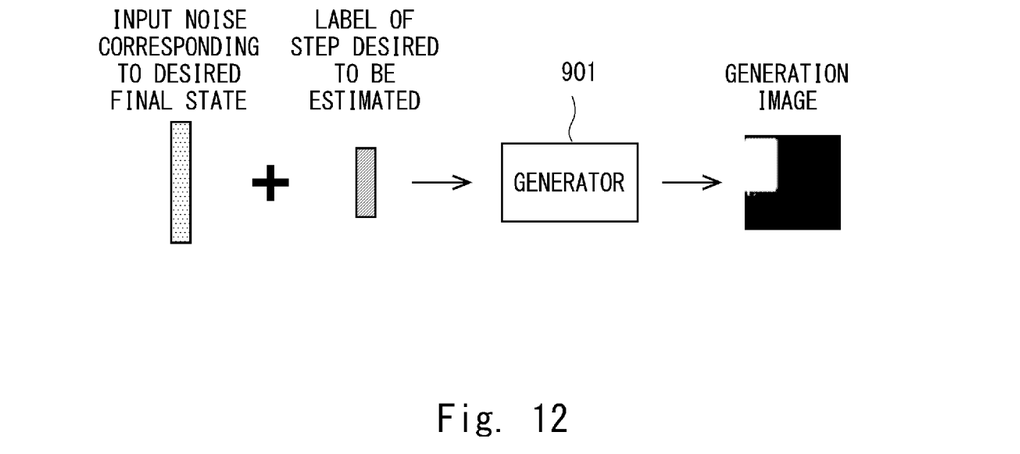
FIG. 12 is a schematic diagram for explaining, in a comparative example, a method for estimating an intermediate process state with a learned generator by the learning method explained with reference to FIG. 11.

FIG. 12 is a schematic diagram for explaining, in the comparative example, a method for estimating an intermediate process state with the learned generator 901 by the learning method explained with reference to FIG. 11. As shown in FIG. 12, an input noise (an estimated nose) corresponding to a desired final state molded in the molding process which proceeds to the final state from the initial state through a plurality of intermediate molded objects, and a label corresponding to a step where it is desired that an intermediate process state be estimated are input to the learned generator 901, the step being in the molding process which proceeds to a final state from an initial state through a plurality of intermediate molded objects. Then, it is estimated that the generation image generated by the generator 901 is an intermediate process state in the step where it is desired in a deformation process optimal for molding that an intermediate process state be estimated.

Figure 13:
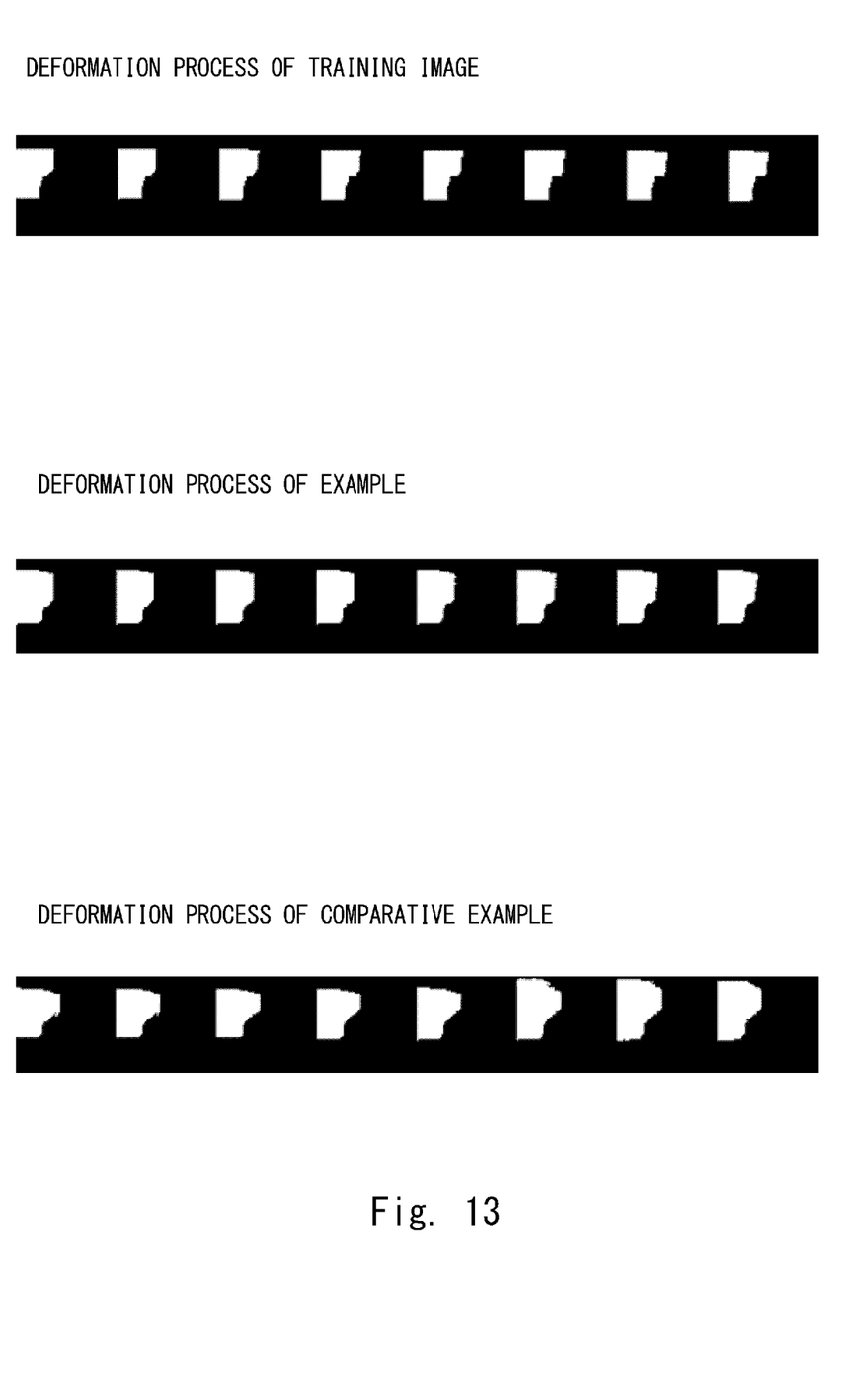
FIG. 13 shows a result of estimating a deformation process from an initial state to a final state in an example and a result of estimating a deformation process from an initial state to a final state in a comparative example.

Next, a verification result of this verification is described. FIG. 13 shows a result of estimating a deformation process from an initial state to a final state in the example and a result of estimating a deformation process from an initial state to a final state in the comparative example. In FIG. 13, a deformation process from an initial state to a final state in the training image is shown in the upper section, a deformation process from an initial state to a final state which is estimated in the example is shown in the middle section, and a deformation process from an initial state to a final state which is estimated in the comparative example is shown in the lower section. As shown in FIG. 13, the deformation process estimated in the example is more similar to the deformation in the training image than the deformation process estimated in the comparative example is.

In a forging process, a volume is always constant in a deformation process from an initial state to a final state. That is, in the deformation process from an initial state to a final state, one of the determination criteria for measuring validity of the estimation of the deformation process from an initial state to a final state is that a deviation (a volume error) between the volume of each of the estimated intermediate process states and volume of the initial state is small. In this estimation, a volume error was 4.1% in the deformation process from an initial state to a final state which is estimated in the example, and it was 5.8% in the deformation process from an initial state to a final state which is estimated in the comparative example, whereas it was 2.7% in the deformation process from an initial state to a final state in the training image. Accordingly, it is possible to determine that the validity of the deformation process from an initial state to a final state which is estimated in the example is higher than that of the deformation process from an initial state to a final state which is estimated in the comparative example. An intermediate process state in the deformation process optimal for molding from an initial state to a final state is estimated in time series.

As described above, in the intermediate process state estimation method according to this embodiment, it is possible to satisfactorily estimate, in time series, an intermediate process state in a deformation process optimal for molding, for a molding process which proceeds to a final state from an initial state through a plurality of intermediate molded objects, by using the method of PairGAN.

Note that the present disclosure is not limited to the above-described embodiments and they can be modified as desired without departing from the scope and spirit of the disclosure. Although the above-described embodiments have been explained as that training data, generation data, and input data are image data, the present disclosure is not limited to such configurations. The training data, the generation data, the input data may include data other than the image data, for example, data regarding stress and temperature, in addition to the image data.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An intermediate process state estimation method for estimating, in time series, an intermediate process state in a deformation process optimal for molding from an initial state to a final state for a molding process that proceeds to the final state from the initial state through a plurality of intermediate molded objects, the method comprising:
   generating, by a first generator and a second generator, generation data based on a first label, a second label, and a common input noise, where the first and second labels correspond to steps included in a plurality of steps of the molding process, the first label corresponding to a certain step among the plurality of steps is input to the first generator and the second label corresponding to a different step from the certain step among the plurality of steps is input to the second generator;
   determining whether an input data pair, randomly input to a discriminator, is a generation data pair or a training data pair so that the first and second generators and the discriminator learn in an adversarial manner from an accuracy of a discrimination result in the discriminator, where the generation data pair is generation data that corresponds to the first label that is generated by the first generator and the second label that is generated by the second generator, and the training data pair is data that a third label corresponding to training data that corresponds to the first label input to the first generator is linked to and data that a fourth label corresponding to training data that corresponds to the second label input to the second generator is linked to, and
   inputting an input noise corresponding to a desired final state molded in the molding process that proceeds to the final state from the initial state through the plurality of intermediate molded objects and a label corresponding to a step included in the plurality of steps where it is desired that an intermediate process state be estimated to one of the respective learned generators to estimate, based on the generation data generated by the generator, the intermediate process state in the step where it is desired that the intermediate process state be estimated.

2. The intermediate process state estimation method according to claim 1, wherein the molding process is divided into a plurality of sub-processes, and a label vector element corresponding to the sub-process for each step has a value obtained by normalizing a value of a vector element corresponding to the sub-process assuming that a value at the beginning of a time series order of the steps in the sub-process is 0 and a value at the end of a time series order of the steps in the sub-process is 1.

3. The intermediate process state estimation method according to claim 1, further comprising:
generating the input noise corresponding to a desired final state molded in the molding process by inputting data of the desired final state and a label corresponding to final states in the plurality of steps to a learned encoder,
wherein learning of the encoder is performed by randomly changing an input noise and a label that corresponds to each step included in the plurality of steps and inputting the changed input noise and label to the learned generator so that the learned generator generates encoder training data, then inputting the encoder training data and the label that is used in generating the encoder training data to the encoder so that the encoder generates an input noise, then inputting the input noise and the label that is used in generating the encoder training data to the generator so that the generator generates generation data, and then making the encoder backpropagate an error between the generation data and the encoder training data.

* * * * *